March 17, 1970     A. PFEUFFER     3,501,060
APPARATUS FOR SUPPLYING A FILTER-AID MATERIAL
Original Filed Feb. 26, 1965     2 Sheets-Sheet 1
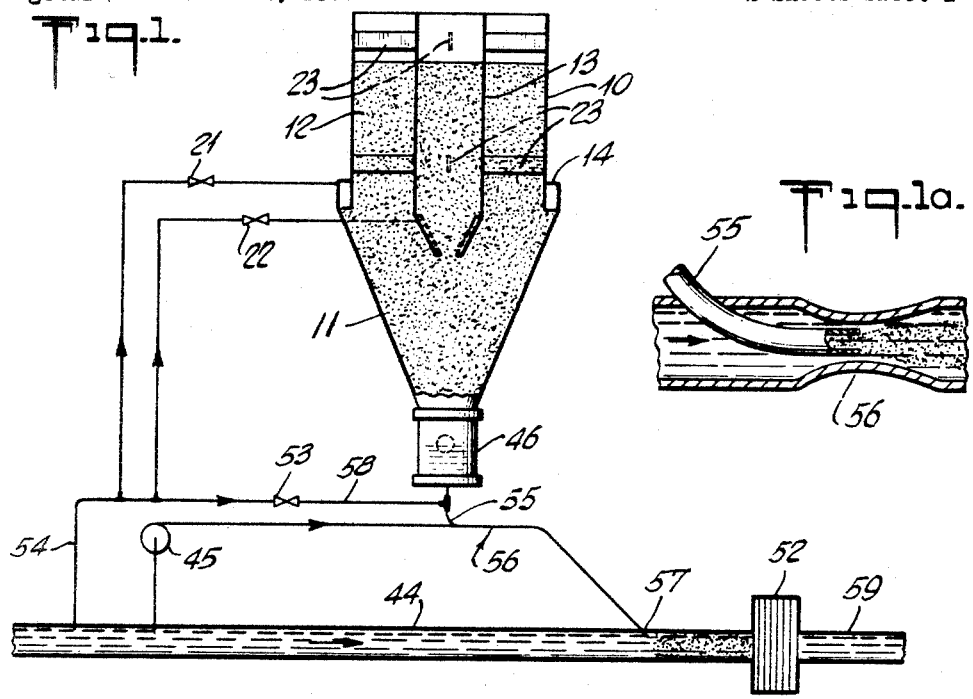
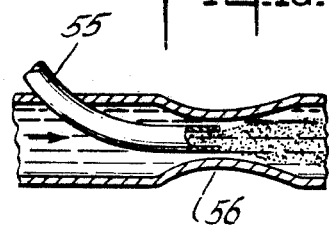
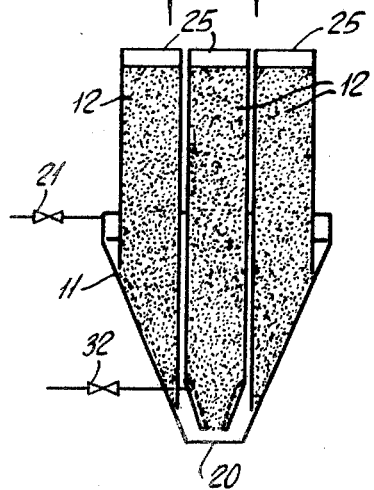
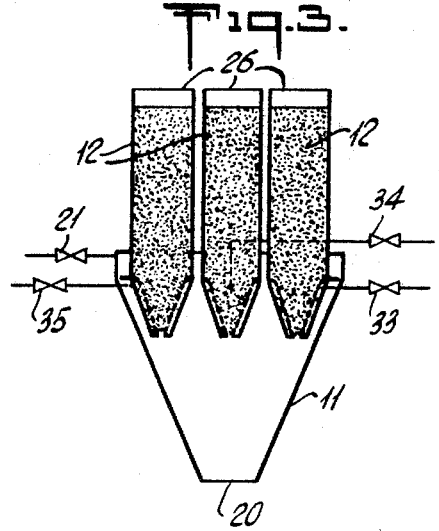
INVENTOR
ANTON PFEUFFER
BY
Nolte & Nolte
ATTORNEYS March 17, 1970  A. PFEUFFER  3,501,060
APPARATUS FOR SUPPLYING A FILTER-AID MATERIAL
Original Filed Feb. 26, 1965  2 Sheets-Sheet 2

INVENTOR.
ANTON PFEUFFER

BY
*Nolte and Nolte*
ATTORNEYS

United States Patent Office 3,501,060
Patented Mar. 17, 1970

3,501,060
APPARATUS FOR SUPPLYING A FILTER-AID MATERIAL
Anton Pfeuffer, 301 E. 78th St., New York, N.Y. 10021
Continuation of application Ser. No. 435,540, Feb. 26, 1965. This application Aug. 23, 1967, Ser. No. 662,834
Int. Cl. B61d 5/54; B01d 31/02
U.S. Cl. 222—189
4 Claims

ABSTRACT OF THE DISCLOSURE

An apparatus comprising a material storing hopper, at least one hollow cylinder connected to the lower end of said hopper, movable wire screens disposed at both ends of said hollow cylinder, drive means for imparting motion to said screens, and means for collecting and mixing the filter-aid material with the fluid in the main line of filtration system.

---

This application is a continuation-in-part of application Ser. No. 435,540, filed Feb. 26, 1965, and now abandoned.

The present invention relates to an apparatus to provide an even and uninterrupted supply of one or more grades of earth filter-aid to a filtration system. Moreover, this invention relates to an improvement to the apparatus described in my Patent 3,039,655 so that filter-aid such as an infusorial earth can be supplied directly to the main line of a filtration system without first mixing the earth with a gaseous carrier.

In conventional filtration systems, measured amounts of a filter-aid material such as infusorial earth are added to a flowing fluid in a pipe line and carried along the pipe line to a filter. It is desirable to be able to add the filter-aid to the pipeline carrying the fluid while said line is under pressure. It is also desirable to be able to mix as thoroughly as possible the filter-aid with the fluid in order to provide for the most effective filtering of the fluid at the filter means. The present invention relies on the principle that an increase in the effective surface area of any given feed supply device will result in an increase in the device's capability of supplying filter-aid to a filtration system.

Therefore, an object of this invention is to provide a novel and improved apparatus of the character mentioned whereby infusorial earth, or the like, can be mixed in controlled amounts to supply a filtration apparatus.

A further object is to provide a novel and improved storage device for large quantities of infusorial earth or the like and supply that earth in controlled and continuous amounts to a filtration apparatus, so as to overcome the tendency of the earth to form bridging in the storage device.

A further object of the apparatus described herein is to provide a series of wash-down funnels located at the lower end of the cylinders contained within the feed device, and the funnel forming the base of the feed device, to provide free and uninterrupted movement of the earth along the vertical planes of said funnels when supplying earth to a filtration system.

Other objects and advantages will become apparent as this disclosure proceeds.

The process and device herein concerned with comprises essentially the mixing of different types of infusorial earth or the like within a hopper consisting of a multitude of cylindrical or concentric chambers, and supplying that earth in a smooth and controlled flow to a filtration system without interruption. In one application used in practice, infusorial earth or the like is stored in an open funnel shaped hopper. As the earth leaves the hopper in controlled amounts, it is fed into a gas discharge pipe line and blown into the top of a cyclonic mixing chamber. The gaseous medium causes the earth to distribute itself uniformly at the bottom of the chamber and mix evenly while under pressure with a liquid medium in contact with the chamber. However, due to the inclined surfaces of the funnel in the hopper, the earth or other bulky material has a natural tendency towards bridging, and not flowing freely into the gas discharge line. To eliminate this problem, several structural elements are added to the interior of the feed device to increase its effective surface area in contact with the earth. The structural elements may consist of a series of cylinders located either concentrically, centrally or eccentrically within the feed device. The bulky material such as infusorial earth is loaded at the top of the feed device and is contained by the structural elements located within. Moreover, by segregating the interior of the feed device into a variety of individual compartments, it is possible to load it with filter material of different consistency and allow it to mix in proportional amounts at the bottom.

The material contained within the feed device moves downward along the vertical walls of the structural elements and converges into wash-down areas situated along the sides of a funnel. The wash-down areas provide an evenly distributed stream of water or other fluid medium to wash down or lubricate the bulky and non free-flowing material toward an outlet at the base of the funnel. In some instances, the cylinders or other structural elements, contained within the feed device are also provided with individual wash-down facilities.

The cylinders contained within the feed device may either be terminated with their own funnels, or terminate against the inclined walls of the funnel area. Radial or helical fins may also be inserted into the walls of the cylinders in order to slow down the vertical descent of the bulky material into the funnel mixing area. The cylinders may also be controlled either individually or simultaneously to supply a desired mixture and feed rate of material to a filtration apparatus. Further advantages of the present invention will become evident from the description with respect to the drawings wherein:

FIGS. 1 and 1a are a cross-sectional view of a feed device according to the invention with a cylinder supported centrally within by vertical fins, and connected to a filter mixing apparatus.

FIG. 2 shows another embodiment of my invention as shown in FIG. 1 comprising a plurality of cylinders terminating against the inclined walls of a funnel.

FIG. 3 is a further refinement of my invention as shown in FIG. 2 wherein a plurality of cylinders are terminated at the same elevation above the base of the funnel.

Figure 4:
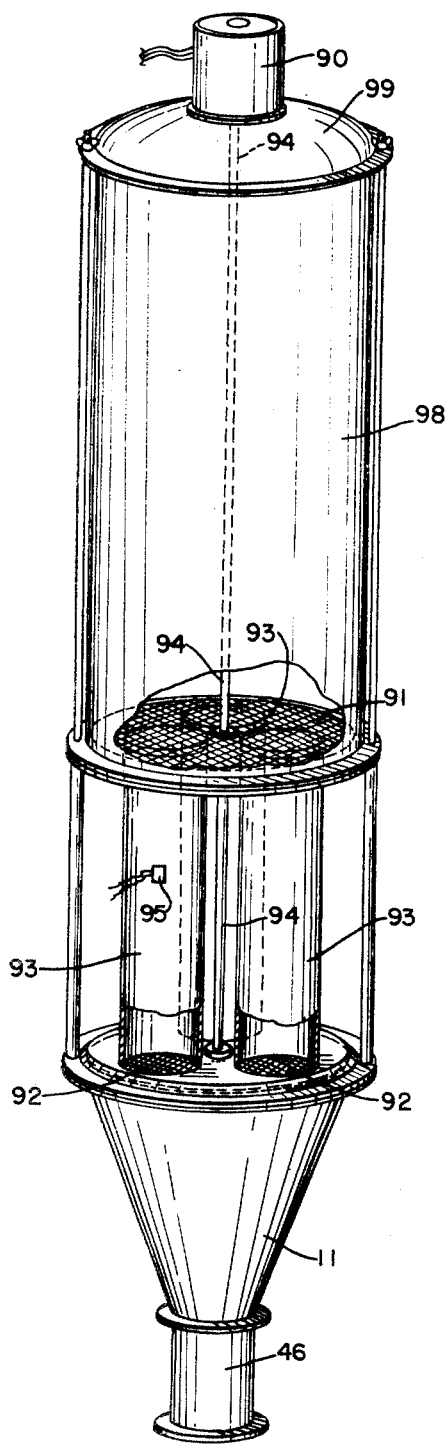
Figure 5:
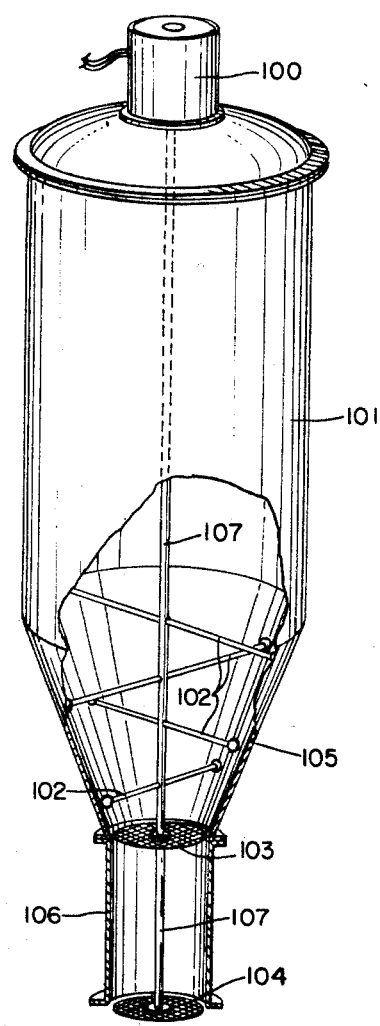

FIG. 4 is another embodiment of a feed device according to my invention wherein the control of the material through the feed device is responsive to one or more revolving wire spring grids inserted transversely with respect to the direction of flow of the feed material; and FIG. 5 illustrates another embodiment of the apparatus of FIG. 4 including the use of revolving agitators to provide further control of the flow of the feed material.

Specifically referring to FIG. 1, a feed device is shown comprising cylindrical hopper 10 and a funnel 11 containing a cylinder 13 supported centrally within hopper 10 by four radially displaced fins 23. The hopper 10 terminates into funnel 11 containing mixed chamber 46 at its base. Pipeline 55 joins mixing chamber 46 to fluid line 56. A pump 45 removes fluid from main line 44 and pumps it along line 56 for a short distance and returns it to line 44 at junction 57.. Line 54 also provides fluid from main line 44 to wash-down valves 21, 22 and check valve 53 on line 58. Wash-down valve 21 controls the amount of water or other fluid entering a slotted annular ring 14, interposed between the inner surface of funnel 11 and the base of hopper 10. Wash-down valve 22 controls the amount of water feeding a similar annular ring positioned within cylinder 13. Bulk material 12 such as infusorial earth is added to the top of hopper 10 so that it is completely contained within the hopper and cylinder 13.

The infusorial earth 12 is supplied to the main fluid line 44 through a series of mixing steps controlled by valves 21, 22 and 53. The earth contained in cylinder 10 is washed down along the walls of funnel 11 by fluid supplied by valve 21 to annular ring 14. Likewise, the earth contained in cylinder 13 is washed down along the walls of funnel member 24 by fluid supplied by valve 22 to a similar annular ring contained within cylinder 13. The earth from both enclosures leaves the feed device at the outlet of funnel 11 where it enters mixing chamber 46 and is combined with fluid from line 58. Valve 53 controls the amount of fluid entering line 58 from main line 44 and thereby affects the earth-to-fluid ratio entering line 56. Pump 45 provides a steady and continuous flow of fluid to line 56. Line 55 joins line 56 through a Venturi arrangement so that the flow of fluid passing the mouth of line 55 within line 56 creates a relative vacuum in line 55 and mixing chamber 46 (see FIG. 1a).

Mixing chamber 46 is identical in design to the mixing chamber described in my Patent, 3,039,655. It consists of a cylindrical container having holes cut in its opposite ends and serves as a ball-check valve for the material contained in the feed device. A small ball float, larger in diameter than the holes, floats on a fluid medium contained within the chamber. The float will seal off the chamber at the top if the fluid rises to a sufficiently high level in the chamber. Likewise, the float will seal off the opening at the bottom if the fluid drops to a sufficiently low level. In order to properly mix the infusorial earth with the fluid, the level of fluid in the mixing chamber is maintained at a sufficient level to keep either opening from being sealed off. The fluid level within the chamber is controlled by regulating the amount of fluid passing through valve 53 supplied by line 58. Generally, valve 53 controls the amount of filter-aid material or earth entering main line 44.

When a new filter cycle is started, it is usually a necessary requirement to charge filter 52 with new filter-aid material as rapidly as possible. Initially, valve 53 is open sufficiently wide to permit the fluid to almost fill the mixing chamber 46. The large volume of fluid in the chamber permits large amounts of filter-aid to be mixed with the fluid and siphoned into line 55 by the Venturi action of the fluid in line 56. As soon as filter 52 becomes sufficiently charged with filter-aid material as indicated by the fluid in line 59 becoming clear, the flow of fluid in line 58 is reduced by valve 53. This causes the level of fluid in mixing chamber 46 to decrease and thereby cutback on the mixing and supplying of filter-aid material to line 44. Moreover, during the charging of the filter and the subsequent operation of the filter apparatus, wash-down valves 21 and 22 are adjusted to permit the filter-aid material to flow without interruption into the mixing chamber. The inclusion of both the wash-down facilities and the structural elements in the feed device serve to substantially reduce the natural tendency of the filter-aid material to bridge or seize within the feed device and disturb the smooth and continuous flow of the material to the filter.

FIG. 2 shows another feed device according to the invention comprising, a funnel containing a plurality of containers terminating along the inner walls of the funnel. Filter aid material 12 inserted at the top of containers 25, is allowed to proceed by gravity toward the walls of funnel 11. In a manner similar to the apparatus described in FIG. 1, wash-down valve 21, connected to the side walls of funnel 11, provides a supply of fluid to wash the filter-aid material down along its sloping inner surface toward outlet 20. Wash-down valve 32 provides additional wash-down fluid for containers 25.

FIG. 3 illustrates a further embodiment of the invention wherein containers 26, mounted vertically in funnel 11, are individually terminated at the same elevation in the funnel. Filter material 12, inserted in containers 26 is washed down toward outlet 20 of funnel 11 by a fluid controlled by wash-down valves 33, 34 and 35. These valves release the fluid medium into slotted or perforated annular rings mounted within containers 26.

FIG. 4 illustrates another method and apparatus, according to my invention, for introducing filter-aid material into the main line of a fluid filter system. In this embodiment, filter-aid material stored in hopper 98 is supplied evenly to each of three hollow vertical cylinders 93 connected to funnel 11 and mixing chamber 46. Mounted rotatably over the openings at both ends of the cylinders are a pair of wire grids or screens mechanically joined together by drive shaft 94. Electric motor 90 centrally mounted on the cover 99 of the hopper 98 applies rotational energy to shaft 94 so as to cause both screens 91 and 92 to rotate around their centers. The mesh or spacing of the wire grids is selected in accordance with the consistency of the filter-aid material stored in hopper 98 so that little or none of the material will descend through the hollow cylinders 93 into the mixing area 46 when the screens are stationary. It is thus possible to control the flow of filter-aid material descending through cylinders 93 and collected by funnel 11 by controlling the speed of the motor 90 applying rotational energy to screens 91 and 92. Screens 91 and 92 need not have the same mesh nor must they rotate at the same angular velocity with respect to each other, since it is conceivable that by suitable gearing means, the angular velocities of the screens may be varied with respect to each other in order to more effectively control the filter-aid material passing therethrough. The means for applying rotational energy to each of the screens need not be confined to a single shaft centrally driving the screens. It is conceivable that the screens may be driven along their periphery by either a suitable belt or pulley system or by a direct gear drive in communication with the periphery. It is also conceivable that the lower screen 92 may be vibrated either transversely or rotationally instead of being driven by the motor so as to sift the filter-aid material as it flows therethrough. The rate of flow of material through the screen 92 would then be controlled by the magnitude of the vibration applied to screen 92. Another variation of the apparatus of FIG. 4 provides that the top screen be actuated in response to the level of material collected in the chamber intermediate screens 91 and 92.

A level detector 95 is mounted along the walls of at least one of the cylinders 93 intermediate screens 91 and 92 to sense the level or backlog of material collected in front of screen 92. The detector 95 is electrically connected to the drive means controlling the motion of upper screen 91. Assuming that lower screen 92 is independently driven or vibrated (not shown), then the flow of material into funnel 11 may be still controlled by the motion of screen 92 while level detector 95 may intermittently actuate screen 91 so as to maintain a constant level or backlog of material in front of screen 92. Assuming that the position of level detector may be varied along the wall of cylinder 93, it is then possible to also control the pressure of the backlog material built up against screen 92 during its flow into funnel 11. The control of both the pressure and rate of flow of the material through the apparatus of FIG. 4 permit it to be adapted to handle a wide variety of materials. The descent of the filter-aid material through funnel 11 and subsequent mixing in mixing chamber 46 takes place as described with respect to the afore-mentioned embodiments.

The apparatus of FIG. 5 is a further embodiment according to my invention of the apparatus as disclosed in FIG. 4. The filter-aid material which is stored in hopper 101 is agitated by revolving members 102 connected to shaft 107, and driven by motor 100. Said agitation members may consist of spokes, blades or combs depending on the consistency of the material. Shaft 107 is also mechanically connected to screens 103 and 104 located on either side of cylinder 106. As the filter-aid material descends downward along the walls of hopper 101, and funnel 105, revolving members 102 cut through the material sufficiently to break up any bridging or inconsistencies that may be present in the filter-aid material.

Screens 103 and 104 are similar to those described with respect to FIG. 4 and also rotate in response to the turning of shaft 107 to further control the amount and consistency of filter-aid material which is distributed in a known manner to a mixing chamber (not shown) and on to the main feed line of a filtration system.

It is conceivable that many of the features of the apparatus disclosed in FIGS. 1-5 may be combined or interchanged to produce feed devices having entirely different operating characteristics. For example, it is within the realm of this invention to combine features disclosed in FIG. 5 with those in copending divisional application Ser. No. 795,851, filed Feb. 3, 1969 to provide a feed device having cyclonic mixing, spiral separation, agitation and screening. It is also conceivable to further include any one of the types of wash-down facilities of FIGS. 1, 2 or 3 in the funnel or tapered portion of the hollow cylinders.

This invention is capable of numerous forms and various applications without departing from the essential features herein disclosed. It is therefore intended and desired that the embodiment shall herein be deemed illustrative and not restrictive and that the patent shall cover all patentable novelty herein set forth; reference being had to the following claims rather than to the specification herein to indicate the scope of this invention.

I claim:

1. An apparatus for supplying a filter-aid material to the fluid in the main line of a filtration system comprising; a hopper for storing the filter-aid material and having an outlet at its lower end, a hollow cylinder having its upper end secured to and in register with said outlet, a screen grid drive shaft extending from the top of said hopper to the bottom of said cylinder, a first flat circular screen grid secured to said drive shaft and extending across said outlet, a second flat circular screen grid secured to said drive shaft and extending across the bottom of said hollow cylinder, and means for imparting rotary motion to said screen grids for controlling the flow of material therethrough, said flow being responsive to the applied motion.

2. The apparatus as recited in claim 1 wherein the mesh of said screens is preselected with respect to the consistency of the material to make the flow of material therethrough proportional to their speed of rotation.

3. The apparatus as recited in claim 1 further comprising a plurality of agitation members inserted in the lower end of the hopper above said first screen and operatively connected to the drive shaft of said motor so that the members move through the filter-aid material in response to rotation of the drive shaft.

4. The apparatus as recited in claim 3 wherein said agitation members comprise a plurality of blades rotating transversely with respect to the flow of filter-aid material through the hopper.

References Cited

UNITED STATES PATENTS

| | | | |
|---|---|---|---|
| 1,857,495 | 5/1932 | Chase | 222—189 |
| 3,151,065 | 9/1964 | Smith et al. | 210—193 X |

ROBERT B. REEVES, Primary Examiner

F. R. HANDREN, Assistant Examiner

U.S. Cl. X.R.

210—193; 222—193, 239